(12) United States Patent
Thorne

(10) Patent No.: US 8,098,902 B2
(45) Date of Patent: Jan. 17, 2012

(54) PROCESSING VIDEO DATA CAPTURED ON A MOBILE DATA CAPTURE DEVICE

(75) Inventor: Jeremy M Thorne, Ipswich (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 985 days.

(21) Appl. No.: 11/791,747

(22) PCT Filed: Nov. 4, 2005

(86) PCT No.: PCT/GB2005/004261
§ 371 (c)(1),
(2), (4) Date: May 29, 2007

(87) PCT Pub. No.: WO2006/059060
PCT Pub. Date: Jun. 8, 2006

(65) Prior Publication Data
US 2008/0166025 A1    Jul. 10, 2008

(30) Foreign Application Priority Data
Dec. 2, 2004   (GB) ................................ 0426523.7

(51) Int. Cl.
*G06K 9/46* (2006.01)

(52) U.S. Cl. .................. 382/118; 382/100; 348/E7.078; 348/E7.081

(58) Field of Classification Search .................. 382/100, 382/118, 274; 348/E7.078, E7.081
See application file for complete search history.

(56) References Cited

U.S. PATENT DOCUMENTS

| | | | |
|---|---|---|---|
| 6,539,099 B1* | 3/2003 | Kellner | 382/103 |
| 7,130,446 B2* | 10/2006 | Rui et al. | 382/103 |
| 2001/0031073 A1* | 10/2001 | Tajima | 382/118 |
| 2002/0076116 A1 | 6/2002 | Eschbach | |
| 2002/0113862 A1 | 8/2002 | Center, Jr. et al. | |
| 2002/0150280 A1 | 10/2002 | Li | |
| 2006/0104487 A1* | 5/2006 | Porter et al. | 382/118 |
| 2006/0233426 A1* | 10/2006 | Mariani | 382/118 |

FOREIGN PATENT DOCUMENTS

| | | |
|---|---|---|
| EP | 1398733 A | 3/2004 |
| WO | WO 2004/053795 A | 6/2004 |

OTHER PUBLICATIONS

Search Report dated Apr. 25, 2005 in GB0426523.7.
International Search Report mailed Jan. 27, 2006 in PCT/GB2005/004261.

(Continued)

*Primary Examiner* — Stephen Koziol
(74) *Attorney, Agent, or Firm* — Nixon & Vanderhye P.C.

(57) ABSTRACT

Video data comprising a plurality of sets of frame data is captured by mobile video data capture device. The video data is processed by a method which comprises: (a) finding a face in each frame of the video, and (b) processing a corresponding set of frame data to: (i) maintain the area of the image occupied by the face substantially constant; and (ii) maintain the apparent direction of light incident upon the face substantially constant; and/or (iii) maintain the apparent color of the face substantially constant.

26 Claims, 5 Drawing Sheets

OTHER PUBLICATIONS

J.P. Lewis, "Fast Normalized Cross-Correlation," Vision Interface, 1995 (reference [10]), pp. 120-123.

Sebe I. O., et al., "A Novel Affine Template Matching Method and Its Application to Real-Time Tracking," AST San Diego Lab, STMicroelectronics Technical Report, Sep. 2002.

Rurainsky, J. et al., "Template-based Eye and Mouth Detection for 3D Video Conferencing," Lecture Notes in Computer Science, Springer Berlin / Heidelberg, ISSN 0302-9743 (Print) 1611-3349 (Online), vol. 2849/2003, Visual Content Processing and Representation, 2003, pp. 23-31.

Xie B. et al., "Component Fusion for Face Detection in the Presence of Heteroscedastic Noise," Annual Conf. of the German Society for Pattern Recognition (DAGM'03), pp. 434-441, 2003.

Welch, G. et al., "An Introduction to the Kalman Filter," TR 95-041, Department of Computer Science, University of North Carolina at Chapel Hill, Chapel Hill, NC 27599-3175, Apr. 5, 2004.

* cited by examiner

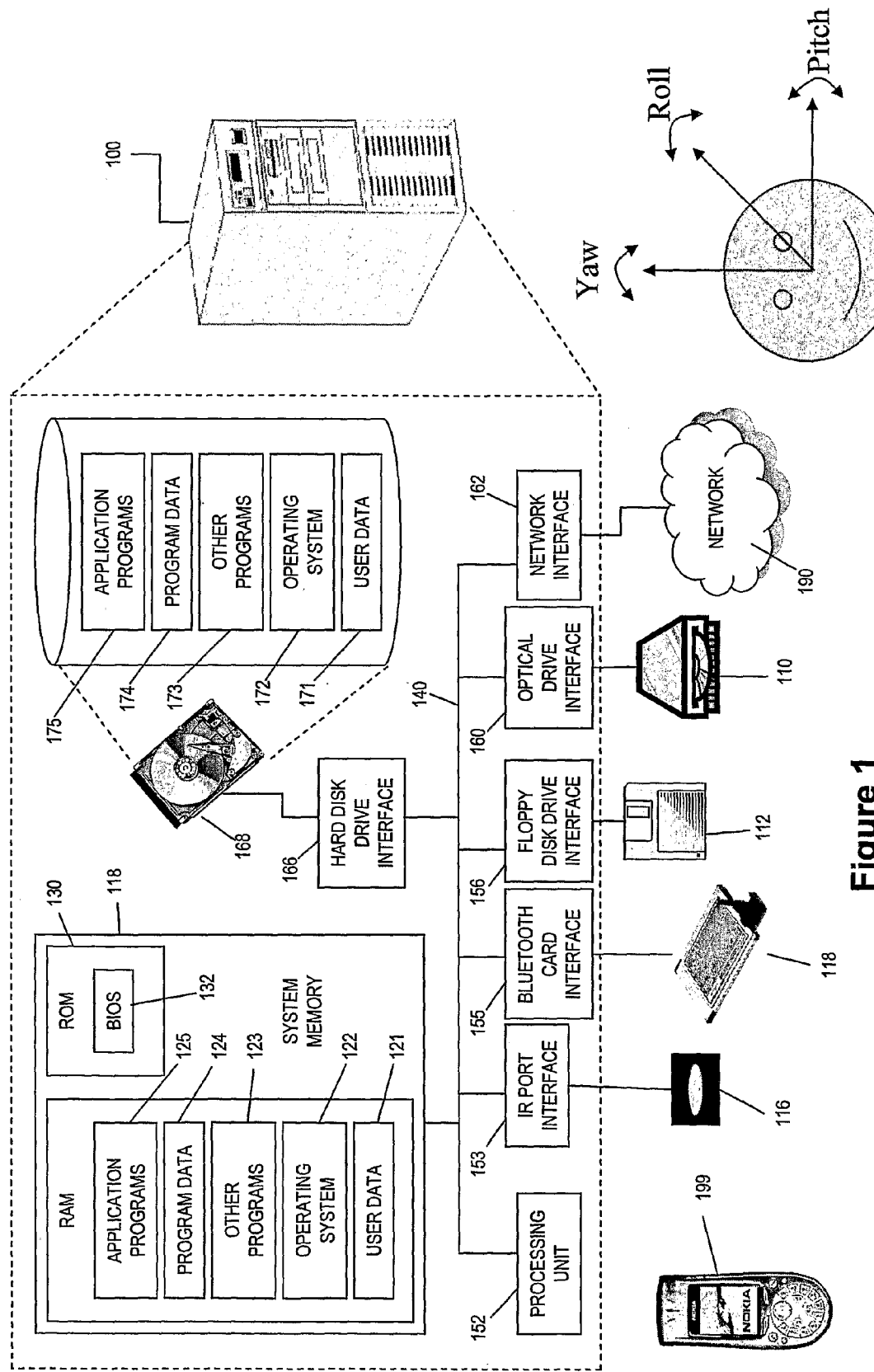

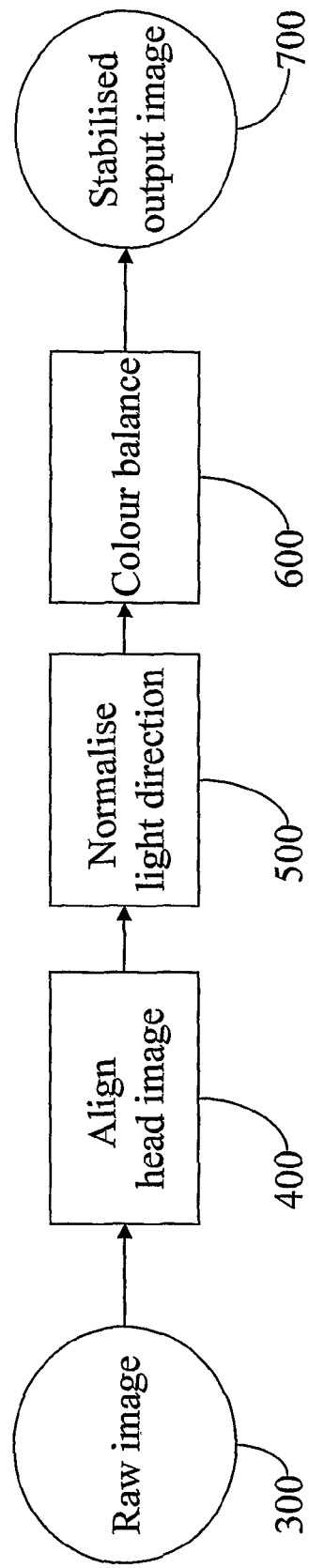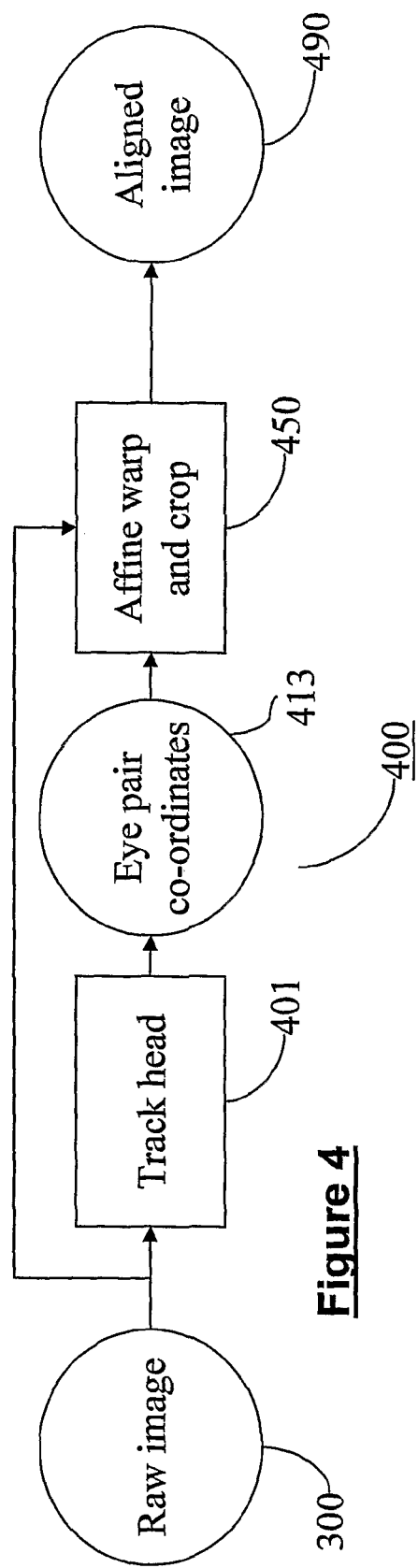

US 8,098,902 B2

PROCESSING VIDEO DATA CAPTURED ON A MOBILE DATA CAPTURE DEVICE

This application is the US national phase of international application PCT/GB2005/004261 filed 4 Nov. 2005 which designated the U.S. and claims benefit of GB 0426523.7, dated 2 Dec. 2004, the entire content of which is hereby incorporated by reference.

BACKGROUND

1. Technical Field

This invention relates to a method and apparatus for processing video data, and in particular to processing video data captured on a mobile video data capture means.

2. Description of Related Art

Video conferencing is a discussion between two or more people who are in different places but can see and hear each other using electronic communications. One goal in offering video conferencing is to enhance the conference by transmitting more of the non-verbal aspects of the conversation. Making the assumption that a major contributing factor to these aspects is the appearance of expressions on the face of a conference participant, it is desirable to present these expressions as clearly and consistently as possible.

In mobile video conferencing, at least one of the video conferencing participants uses a camera equipped mobile communications device and is therefore able to move whilst remaining within the field of view of the camera.

The appearance of a video conferencing participant in a frame of video captured by a camera equipped mobile communications device is subject to variations in position, size, orientation, lighting direction and colour.

Position, size and orientation changes are due to the relative global motion between the participant and the camera. Conventional techniques for detecting moving objects such as background subtraction and frame differencing will not work as they assume that the background is stationary, which is not the case if the user himself is moving.

As the conference participant moves through an environment with many light sources or causes rotation of the mobile communications device, there will be substantial changes in the direction from which the light falls on the participant's face and also substantial changes in colour of the face due to the changes of the incident light falling on the face or the result of light reflected from coloured objects. These lead to gradual but substantial changes in the intensity and colour of the pixels that make up the image of the face. If the raw video data is subsequently encoded in order to meet a low 'maximum bit rate' requirement, there will be a trade off between coding these variations and the clarity of facial expressions and as a result the variations will diminish the clarity of the facial expressions.

Additionally, in current camera equipped mobile communications devices white balance compensation is sometimes applied to the image. White balance compensation seeks to adjust the gains of the red, green and blue (RGB) channels of the image so that the total brightness of the channels are equal. This can result in the face (which only forms a portion of the image) appearing green or blue.

BRIEF SUMMARY OF PRESENT EXAMPLE EMBODIMENTS

According to a first aspect of the present invention there is provided a method of processing video data captured by mobile video data capture means, said video data comprising a plurality of sets of frame data, said method comprising:
 (a) finding a face in each frame of said video; and
 (b) processing a corresponding set of frame data to:
  (i) maintain the area of the image occupied by said face substantially constant; and
  (ii) maintain the apparent direction of light incident upon said face substantially constant; and/or
  (iii) maintain the apparent colour of said face substantially constant.

By identifying a face in a frame of video data captured by mobile video data capture means and transforming the frame data to compensate for motion of the face, changes in size of the face, changes in the direction of light incident upon the face and changes in the colour of the face, it is possible to reduce changes in the appearance of the face between frames and maximise the clarity of the expressions of the face. Moreover, without adjusting for lighting direction and colour, many bits would be wasted in transmitting changes in the identified facial region that do not contribute to the facial expressions posed, thus expending more processing power and/or leading to a less than optimal use of bandwidth.

The term 'colour' is intended to include both chromatic colours (those having hue—a property of colours by which they can be perceived as ranging from red to violet as determined by the dominant wavelength of the light) and achromatic colours (those lacking hue, i.e. white, grey and black).

Preferably, finding a face comprises identifying one or more features on said face, which comprises: comparing regions of said frame data with stored feature templates, each of said feature templates comprising an image of a facial feature and corresponding in size to said regions; and identifying each feature by identifying a match between a region of said frame data and one of said templates. Preferably, said features comprise a pair of eyes on said face. Eyes are good for use in template matching because their shape remains relatively static when viewed from different angles and also because there is a good amount of contrast within the template.

Preferably, said method further comprises checking the distance and angle of rotation between each of the eyes in said identified pair of eyes. In this way, a pair of eyes that is not valid (because they are either too far apart or the angle of rotation between them is too great) can be rejected.

Preferably, maintaining the apparent direction of light incident upon said face comprises: low pass filtering said frame data; subtracting said low pass filtered version of said frame data from said frame data; and adding a low pass filtered version of previously stored reference frame data to said low pass filtered version of said frame data, wherein said previously stored reference frame data comprises an image of said face under neutral lighting. By adding in a low pass filtered version of previously stored reference frame data the resultant frames look more natural.

Other aspects of the present invention are defined in the claims.

BRIEF DESCRIPTION OF DRAWINGS

Embodiments of the present invention will now be described, by way of example only, with reference to the accompanying drawings, wherein like reference numbers refer to like parts, and in which:

FIG. 1 is an illustration of a system block diagram of the system components of a general purpose computer system;

FIG. 2 is an illustration indicating the directions of movement of a user's head;

FIG. 3 is a flow diagram illustrating the operation of an image processing method;

FIG. 4 is a flow diagram illustrating the operation of the align head image stage of the image processing method;

DETAILED DESCRIPTION OF PRESENT EXAMPLE EMBODIMENTS

Figure 5:
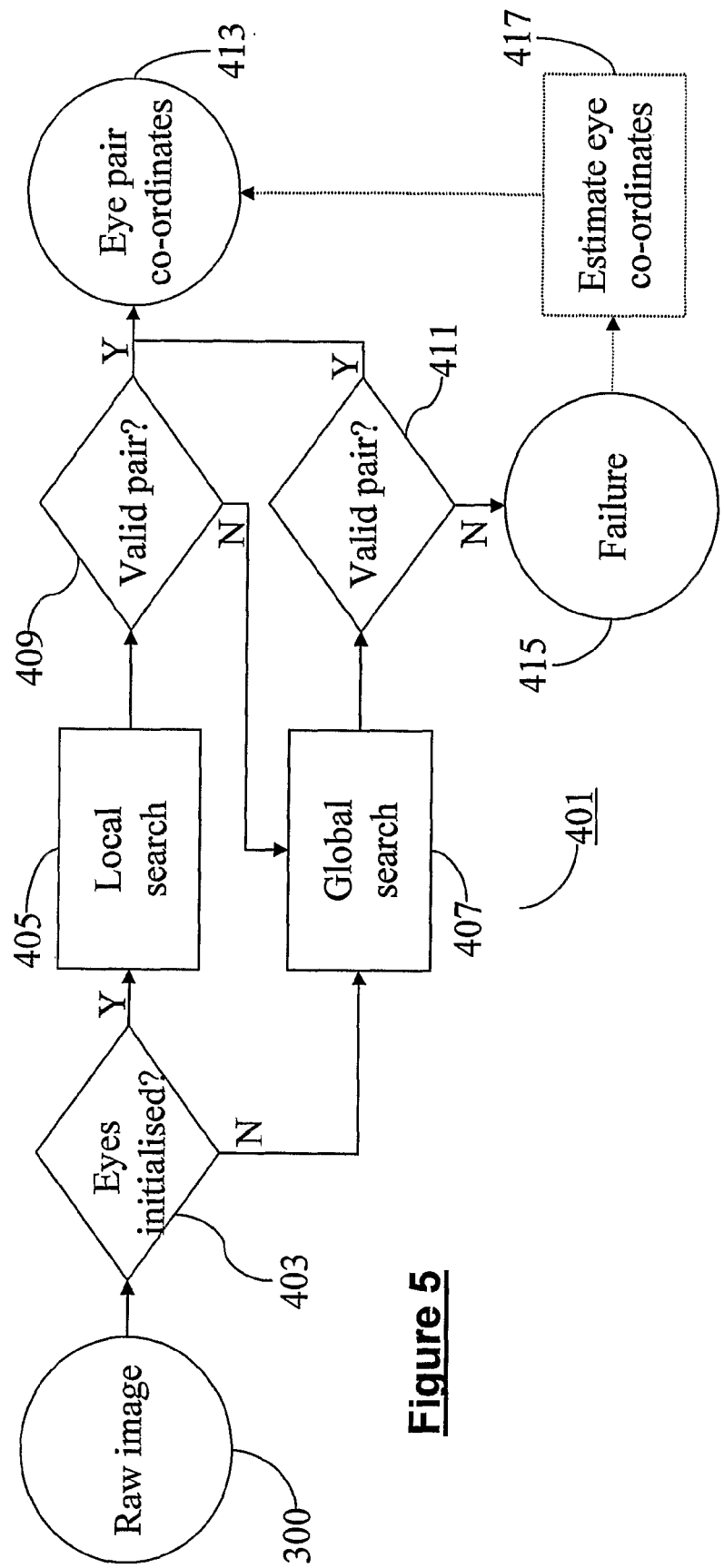
FIG. 5 is a flow diagram illustrating the operation of the track head stage of the align head image stage of the image processing method.

A general purpose computer system used in some embodiments of the present invention will now be described, with reference to FIG. 1. Other embodiments might use hand held devices, notebook computers, main frame computers, mini computers, multi processor systems, distributed systems, etc. Given the broad range of hardware that may be programmed to implement the present invention, the operation of the invention will be described below generally as computer executable instructions, such as program modules, being executed by this computer system's computer. Such program modules may include processes, programs, objects, components, data structures, data variables, or the like that perform tasks or implement particular abstract data types. Within a distributed computing environment, multiple computer systems may be connected to a communications network and individual program modules of the invention may be distributed amongst the computer systems.

A general purpose computer system (FIG. 1) which is generally known in the art comprises a desk-top tower base unit 100 within which is contained the computer processing unit, mother board, hard disk drive or drives, system memory and an optical disk drive 110 which is capable of reading from and/or writing to a removable optical disk such as a CD, CD-R, CD-RW, DVD, or the like. Furthermore, the base unit 100 also houses a magnetic floppy disk drive 112 capable of accepting and reading from and/or writing to magnetic floppy disks.

It will be appreciated that FIG. 1 illustrates an exemplary computer system only, and that other configurations of computer systems are possible which can be used with the present invention. In particular, the base unit 100 may be in a desktop configuration, or alternatively the computer system may be portable in that it is embodied in a lap-top, note-book or handheld configuration.

The internal components of the computer system include a motherboard upon which is mounted system memory 118 which itself comprises random access memory 120, and read only memory 130. In addition, a system bus 140 is provided which couples various system components including the system memory 118 with a processing unit 152. Also coupled to the system bus 140 a floppy disk drive interface 156 which controls the floppy disk drive 112 so as to read data from any floppy disk inserted therein, or to write data thereto; an optical drive interface 160 which controls the optical disk drive 110 so as to read data from and write data to a removable optical disk inserted therein; an infrared (IR) port interface 153 which controls an IR port 116 and a Bluetooth™ card interface 155 which controls a Bluetooth™ PC card 118. The IR port 116 and Bluetooth™ PC card 118 allow the computer system to communicate with other similarly enabled devices. Also couple to the system bus 140 is a network interface 162 in the form of a network card or the like arranged to allow the computer system to communicate with other computer systems over a network 190. The network 190 may be a local area network, wide area network, local wireless network, or the like. In particular, IEEE 802.11 wireless LAN networks may be of particular use to allow for mobility of the computer system. The network interface 162 allows the computer system to form logical connections over the network 190 with other computer systems such as servers, routers, or peer-level computers, for the exchange of programs or data.

With respect to the network interface 162, whilst we have previously described how this is preferably a wireless LAN network card, although equally it should also be understood that the computer system may be provided with a modem attached to a serial or parallel port interface (not shown), and which is arranged to form logical connections from the computer system to other computers via the public switched telephone network (PSTN).

Where the computer system is used in a network environment, it should further be understood that the application programs, other programs, and other data which may be stored locally in the computer system may also be stored, either alternatively or additionally, on remote computers, and accessed by the computer system by logical connections formed over the network 190.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data files, program modules, and other data for the computer system. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores application programs 175, application program data 174, other programs 173 required by the computer system 1 or the user, a computer system operating system 172 such as Microsoft® Windows®, Linux™, Unix™, or the like, as well as other user data 171. The hard disk drive 168 provides non volatile storage of the aforementioned programs and data such that the programs and data can be permanently stored without power.

In order for the computer system to run the application programs or work with data stored on the hard disk drive 168, or other computer readable storage media, the system memory 118 provides the random access memory 120, which provides memory storage for the application programs, program data, other programs, operating systems, and user data, when required by the computer system. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system. The BIOS is essential at system start-up, in order to provide basic information as to how the various system elements communicate with each other and allow for the system to boot-up.

In a first embodiment of the present invention a video communications system is provided. The communication system includes a computer system, as has already been described, and a portable, handheld device 199, such as a Nokia 3650 mobile telephone.

When switched on, the computer system runs the Microsoft® Windows® 2000 operating system program, stored on hard disk 168. As will be understood by those skilled in the art, that operating system program supports DirectX 8.1 which includes the Microsoft® Direct Show Application Programming Interface (API).

Device 199 includes a camera that can capture video and encode it according to the International Telecommunications Union's (ITU) H.263 standard. Captured video is stored on the mobile device 199 as a 3GPP multimedia file; a file standard defined by the $3^{rd}$ Generation Partnership Project. Device 199 can exchange information with the computer system 1 via infrared or Bluetooth™ using software that is has been preinstalled on the computer system and stored on the hard disk drive 168. Also stored on the computer system is a freeware tool called mov2avi that makes use of the Quick-Time software of Apple Computer, Inc. to convert 3GPP multimedia files (received from mobile device 199) to AVI files, which can be read using functionality provided in the DirectShow API.

Also installed on the computer system is the OpenCV software library and Image Processing library (IPL); both available from Intel® Corporation, 2200 Mission College Blvd., Santa Clara, Calif. 95052, USA.

In the present embodiment, an image processing program is provided on CD ROM, installed on the computer system using optical disk drive 110 and stored on hard disk drive 168. The program code is written in the C++ programming language and, when compiled and run, processes the AVI file representing the video data captured by the camera of device 199.

The image processing program will now be described in relation to FIGS. 3 to 8. In the following description the following assumptions are made: (1) a user is looking at the camera; (2) both of the user's eyes are visible; (3) the pitch, roll and yaw of the user's head are small (i.e. <c10°); and (4) the camera remains at a normal viewing distance (i.e. c15-50 cm). The pitch, roll and yaw of a user's head are defined with reference to FIG. 2. Pitch is related to nodding the head, roll is related to moving the ears towards the shoulders and yaw is related to shaking the head.

Pseudo code for the main loop of the image processing program (FIG. 3) is given below:

```
mainLoop( )
{
setup( )
state:trackState
state.eyesInitialised=false
while(!quit)
    {
    captureImage(rawImage)
    mobileFacePreprocessor(rawImage,state,stabilisedCImage,
    stabilisedECImage)
    doSomething(stabilisedCImage, stabilisedECImage)
    }
}
```

In other words and with reference to FIG. 3, the image processing program 3 involves processing raw image data 300 into stabilised output image data 700. Raw image data 300 is raw in the sense that it has not been processed by the image processing program 3 and comprises a set of video frame data that has been captured, stored by device 199 in the form of a 3GPP file, transferred to computer system 1 and converted into an AVI file. The DirectShow API is then used to read frames from the AVI file, which frames form the raw image data 300.

The setup function called in the main loop is used to load and initialize some variables that are used in the main function (mobileFacePreprocessor( )). The various functions called within the setup function will be described in more detail below.

The raw image data 300 is then processed in three stages 400, 500, 600. The first stage finds and aligns an image of a head in each frame of the raw image data (400), the second stage normalises the direction of the light falling on the face of that head (500), and the third stage corrects the colour balance of the image (600). A pseudo code example for main function (mobileFacePreprocessor( )) of the image processing program (FIG. 3) is given below:

```
mobileFacePreprocessor(in rawImage:image, inout t:trackstate,
out stabilisedECImage:image, out stabilisedCImage:image)
{
alignHeadImage(rawImage,t,extremeCloseupImage,closeupImage)
normaliseLightDirection(extremeCloseupImage,
extremeCloseupBlurNeutral,balancedECImage)
normaliseLightDirection(closeupImage,closeupBlurNeutral,
balancedCImage)
colourBalance(balancedECImage,stabilisedECImage)
colourBalance(balancedCImage,stabilisedCImage)
}
```

Each of these stages will be described in more detail below.

Align Head Image (400)

With reference to FIG. 4, the stage of aligning a head image in each frame of the raw image data (400) will now be described. Aligning a head image consists of two stages: (i) tracking the head (401); and (ii) performing an affine warp (a combination of a linear translation and a rotation) and crop of the raw image data 300 such that the head remains at the same location, orientation and scale over all the frames (450). A pseudo code example for the align head image 400 stage is given below:

```
alignHeadImage(in rawImage:image, inout t:trackState,
out extremeCloseupImage:image, out closeupImage:image)
{
trackHead(rawImage,t)
//get extreme closeup
desiredEyeWidth:int = 0.6*extremeCloseupImage.width
desiredRightEyeLocation:point=(0.2*extremeCloseupImage.width,
0.3*extremeCloseupImage.width)
affineWarpAndCrop(rawImage,t.eyeLocations,desiredEyeWidth,
desiredRightEyeLocation,extreme CloseupImage)
//get closeup
desiredEyeWidth = 0.4*closeupImage.width
desiredRightEyeLocation = (0.3*closeupImage.width,
0.41*closeupImage.height)
affineWarpAndCrop(rawImage,t.eyeLocations,desiredEyeWidth,
desiredRightEyeLocation,closeupImage)
}
```

Each of the stages will now be described in more detail.

Track Head (401)

Tracking is the repeated process of following the motion of certain features of the user's head across frames. The alternative would be to perform a new search for the desired feature(s) across all the pixels in the raw image. Tracking is better, however, because given an initial estimate a search only around that estimate can be performed thus using less computing processing resources. In the present embodiment, tracking the head is achieved by tracking the motion of the user's eyes. Tracking can fail if it is not possible to find the feature within the small area that is checked. This can happen, for example, if the feature is occluded (hidden by some other object, e.g. the user's hand) or if the feature moved outside the region that is being checked (e.g. a sudden move of the camera causing the feature to shift wildly across the frame).

In the present embodiment, the method of tracking the head (401) is described by the pseudo code below:

```
trackHead(in rawImage:image,inout t:trackState)
{
lostTrack:boolean=false
if(t.eyesInitialised)
  {
   updateKalmanByTime(t)
   localSearch(rawImage,t.predictedEyeLocations,eyeTemplates,
   newEyeLocations)
   if(validPair(newEyeLocations,rawImage.width))
     {
      t.measuredEyeLocations=newEyeLocations
      updateKalmanByMeasurement(t)
     }
   else
     {
      lostTrack=true
     }
  }
else
  {
   lostTrack=true
  }
if(lostTrack)
  {
   globalSearch(rawImage,eyeTemplates,newEyeLocations)
   if(validPair(newEyeLocations,rawImage.width))
     {
      t.measuredEyeLocations=newEyeLocations
      t.eyesInitialised=true
      initialiseKalman(t)
     }
```

-continued

```
   else
     {
      t.eyesInitialised=false
      //t.eyeLocations remain at last locations
     }
  }
}
```

In other words, and with reference to FIG. 5, the process begins by checking whether or not there is an initial position for the eyes (403), i.e. whether or not co-ordinates of an eye pair have been found for a previous frame. If the result of this check is positive, i.e. co-ordinates of an eye pair have been found for a previous frame, then tracking of the head is possible and a local search (405) is carried out for the user's eyes in the current frame using the previously found co-ordinates as the initial estimate. On the other hand, if the result is negative, then tracking of the head has failed and a global search (407) for the user's eyes across the entire raw image is carried out instead. Both the local search (405) and the global search (407) will be described in more detail below.

Local Search 405

In the present embodiment, the method of performing the local search (405) is described by the pseudo code below:

```
localSearch(in rawImage:image, in oldEyeLocations:eyeLocations, in eye
Templates:imagePair, out newEyeLocations:eyeLocations)
{
localSearch2(rawImage,oldEyeLocations.left,eyeTemplates.left,
newEyeLocations.left)
localSearch2(rawImage,oldEyeLocations.right,eyeTemplates.right,
newEyeLocations.right)
}
localSearch2(in rawImage:image, in oldEyeLocation:point, in eye
Template:image, out newEyeLocation:point)
{
searchRange:point = (25+template.width/2,25+template.width/2)
//25 is a function of the raw image width. 25 = 320/12.8 =
rawImage.width/12.8
rawImage.roi = createROI(oldEyeLocation–
searchRange,oldEyeLocation+searchRange)copyImage(rawImage,region)
colorToGrey(region,greyRegion)
matchTemplate(greyRegion,template,match)
locateMaximum(match,newEyeLocation)
}
```

A local search is carried out for both the user's left eye and the user's right eye and is performed by template matching using normalised cross correlation.

Template matching comprises comparing a template containing a known example of the feature of interest with regions in the raw image data in order to find a match. In the present embodiment, two templates are stored in advance; one is a previously taken image of a left eye of the user (eyeTemplate.left), used for detecting the location of the left eye in the raw image data, and the other is a previously taken image of the right eye of the user (eyeTemplate.right), used for detecting the location of the right eye in the raw image data. The two templates are created from a still image captured on device 199 and are, consequently, very similar in appearance and size to those expected in the frame being examined. Normalised cross correlation is a mathematical technique that is used to generate a score for the comparison between a region of the raw image and a template.

A square shaped search range is first set up based on the size of the stored templates and then a region of interest in the raw image data is selected using the createROI function of the IPL software library. This region is offset from the previously found eye co-ordinates by the search range. Template matching is performed on a greyscale version of the image (a single 2D array of integers with each integer representing the intensity at a location (x,y), i.e. a single channel) and so the region is then converted to greyscale using the colorToGrey function of the IPL software library. (The templates can be stored as greyscale images or can be converted to greyscale images when they are needed). The cvMatchTemplate function of the OpenCV software library is then used to perform the template matching and normalised cross correlation of the greyscale templates over the entire greyscale region. The new eye location (a set of co-ordinates for the user's left and right eyes) is taken to be the location in the region with the highest comparison score and this is calculated using the cvMinMaxLoc function of the OpenCV software library.

The eye pair co-ordinates obtained from the local search are then tested to check whether or not they are valid (409). That is, the relative locations of the left and right eyes are checked to ensure they are not too far apart or too close together and that the angle of rotation between them is small. In the present embodiment, the method of performing the valid pair test (409) is described by the pseudo C++ code below:

```
validPair(eyeLocations:eyeLocations,imageWidth:int):boolean
{
    edx:double = eyeLocations.left.x-eyeLocations.right.x;
    edy:double = eyeLocations.left.y-eyeLocations.right.y;
    ed:double = sqrt(edx*edx+edy*edy);
    ea:double = tan-1(edy/edx);
    badPair:boolean = (ed<0.1*imageWidth || ed>0.4*imageWidth ||
    ea>0.5 || ea<-0.5)
    return (!badPair)
}
```

In the present embodiment, the eye pair is considered invalid if the distance between the right and left eyes, ed is less than 0.1*imageWidth or greater than 0.4*imageWidth, where ed and imagewidth (the width of the image) are measured in pixels; or the roll of the head, ea is greater than 0.5 or less than −0.5, where ea is measured in radians. These limits would, however, vary depending on the field of view of the camera in device 199. If the eye pair is found to be invalid then tracking of the head has failed and a global search (407) for the user's eyes across the entire raw image is carried out instead. If the eye pair is found to be valid then the head tracking stage 401 is complete as a set of eye pair co-ordinates 413 has been found.

During the local search 405, it is possible, in addition to the co-ordinates of an eye pair, to take into account the 'velocity' of the co-ordinates that have been found for a previous frame as observed across a sequence of previous frames. This has the effect of improving the estimated location of the eye pair during the local search. A Kalman filter (a set of mathematical equations that provides efficient computational means to estimate the state of a process) can be used to add this functionality to the local search and in the present embodiment it is provided by the cvKalmanUpdateByTime and cvKalmanUpdateByMeasurement functions of the OpenCV software library.

Global Search 407

In the present embodiment, the method of performing the global search (407) is described by the pseudo code below:

```
globalSearch(in rawImage:image, in eyeTemplates:imagePair,
out newEyeLocations:eyeLocations)
{
    colorToGrey(rawImage,grey)
    //templateMatch(rawImage,template,match)
    matchTemplate(grey,eyeTemplate.left,match.left)
    matchTemplate(grey,eyeTemplate.right,match.right)
    //blur(match,blur)
    blur(match.left,blur.left)
    blur(match.right,blur.right)
    //shift(blur,rawImage.size,shift)
    shift(blur.left,shift.left,-0.17*imageSize.width,
    0.004*imageSize.height)
    shift(blur.right,shift.right,0.17*imageSize.width,
    -0.004*imageSize.height)
    //multiply(match,shift,bestGuess)
    multiply(match.left,shift.right,bestGuess.left)
    multiply(match.right,shift.left,bestGuess.right)
    //locateMaxima(bestGuess,newEyeLocation)
    locateMaximum(bestGuess.left,newEyeLocation.left)
    locateMaximum(bestGuess.right,newEyeLocation.right)
}
```

Figure 6:
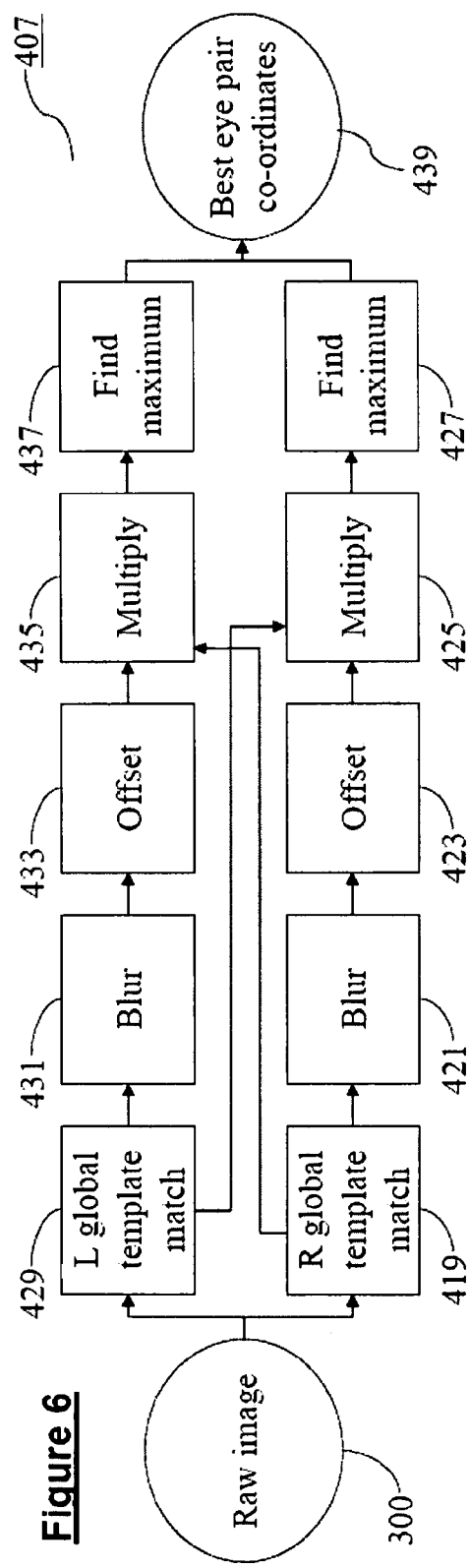
FIG. 6 is a flow diagram illustrating the operation of the global search stage of the track head stage of the align head image stage of the image processing method.

In other words, and with reference to FIG. 6, the process starts with a global template match performed for the right and left eyes (419,429)—normalised cross correlation with a greyscale template over a greyscale version of the entire raw image data. Like before, the cvMatchTemplate function of the OpenCV software library is used to perform the template matching and normalised cross correlation. The resulting scores from the cross correlation for each location can be seen as a map of the estimated probability that there is an eye at that particular location.

It is then possible to estimate the position of the left eye based on the knowledge of its relative position with respect to the right eye and also to estimate the position of the right eye based on the knowledge of its relative position with respect to the left eye. Statistics from a simple video training sequence captured on device 199 (when the head movement was sufficiently slow for head tracking to succeed without needing to perform a global search) has shown that the positions of a user's left eye form a distribution, offset from the position of the user's right eye by the average eye separation. Thus, it is possible to form a probability map of the location of the left eye by convolving the right eye estimate (obtained from the right eye global template match 419) with a Gaussian (an operator used to 'blur' images and remove detail and noise) and offsetting. It is also possible to form a probability map of the location of the right eye by convolving the left eye estimate (obtained from the left eye global template match 429) with a Gaussian and offsetting. This is represented in the above pseudo code by the 'blur' and 'shift' functions and in FIG. 6 by steps 421/423 and 431/433. In the present embodiment, the x and y shifts (as calculated using the training sequence) are −0.17*ImageWidth and 0.004*ImageHeight respectively for the left eye and 0.17*ImageWidth and −0.004*ImageHeight for the right eye.

In the present embodiment the method of performing the 'blur' is described by the pseudo code below:

```
blur(in match:image,out blur:image)
{
    convolveSep2D(match,blur,gaussianKernelx,gaussianKernely)
}
```

. . . where the convolveSep2D function is provided by the Intel IPD software library. A pseudo code example of a function that can be used to set up Gaussian kernels is given below:

```
createGaussianKernels(in filterLength:int,out kernelx:convKernel,out
kernely:convKernel)
{
//simple gaussian
filterCoeffs:int[filterLength]
m:double = filterLength/2
s:double = filterLength/8
g:double = 255/(s*sqrt(2*pi))
f:double = 2*s*s
for(int i=0;i<filterLength;i++)
    {
    x:double = i-m
    filterCoeffs[i]=(int)(g*exp(-x*x/f))
    }
kernelx = filterCoeffs
kernely = filterCoeffs
}
```

To set up the Gaussian kernels gaussianKernelx and gaussianKernely, this function can be called as follows as part of the setup function.

CreateGaussianKernels(21,gaussianKernelx,gaussianKernely)
//filter length is 21

In the present embodiment the method of performing the 'shift' (i.e. the offsetting described above) is described by the pseudo code below:

```
shift(in in:image,in x:int,in y:int,out shift:image)
{
fillImage(shift,0)
if(x>=0 && y>=0)
    {
    in.roi=createROI((0,0),(in.width-x,in.height-y))
    shift.roi=createROI((x,y),(in.width-x,in.height-y))
    }
else if(x<0 && y>=0)
    {
    in.roi=createROI((-x,0),(in.width+x,in.height-y))
    shift.roi=createROI((0,y),(in.width+x,in.height-y))
    }
else if(x<0 && y<0)
    {
    in.roi=createROI((-x,-y),(in.width+x,in.height+y))
    shift.roi=createROI((0,0),(in.width+x,in.height+y))
    }
else if(x>=0 && y<0)
    {
    in.roi=createROI((0,-y),(in.width-x,in.height+y))
    shift.roi=createROI((x,0),(in.width-x,in.height+y))
    }
//copy from one Region of interest (roi) to the other
copyImage(in,shift)
}
```

The createROI function is provided by the Intel IPD software library and the fillImage and copyImage functions are provided by the cvFillImage and cvcopyImage functions of the Intel OpenCV software library.

Thus, from the template matching (419/429), blurring (421/431) and offsetting (423/433), there are two estimates for the location of the right eye; one obtained from the right eye global template match (called 'match.right' in the above pseudo code) and one obtained by blurring and offsetting the global template match for the left eye (called 'shift.left' in the above pseudo code). Similarly, there are two estimates for the location of the left eye (called 'match.left' and 'shift.right' in the above pseudo code).

The 'best' location for each eye is where the template match estimate and the offset blurred template match estimates are both good. The two estimates can be combined by multiplying them together and this is represented in the above pseudo code by the 'multiply' function and in FIG. 6 by steps 425/435. In the present embodiment, the multiply function is provided by the Multiply function of the Intel IPL software library, which performs a pixelwise multiplication of two images a & b to form a new image c such that $c(x,y)=[a(x,y)*b(x,y)/255]$. In the above pseudo code, the input images are called 'match' and 'shift' and the output image is called 'BestGuess'. A search for the global maximum (the 'locateMaximum' function in the above pseudo code and stages 427/437 in FIG. 6) is then performed using the cvMinMaxLoc function of the Intel OpenCV software library, which yields a best pair of eye co-ordinates 439.

Referring once again to FIG. 5, the best pair of eye co-ordinates obtained from the global search is then tested to check whether or not it is valid (411). This check is similar in nature to that performed on the eye pair co-ordinates obtained from the local search as described above in relation to step 409. If the eye pair is found to be valid then the head tracking stage 401 is complete as a set of eye pair co-ordinates 413 has been found. If, however, the eye pair is found to be invalid then tracking of the head has failed 415. In this situation, one option is to not provide an output for this frame of data and restarting the process for the next frame of data without an initial position for the eyes. This leads to failure of the test carried out in step 403 ensuring that another global search 407 is performed. There is also the option of estimating the eye pair co-ordinates (417) relative to the last known position of the eyes (e.g. by using a Kalman filter).

Affine Warp and Crop (450)

Having obtained the co-ordinates of an eye pair 413, it is possible to perform an affine warp and crop (450) of the raw image 300 such that the head remains at the same location, orientation and scale over all the data frames. In the present embodiment, the affine warp and crop only accounts for changes in the x,y position and the scale and roll of the head. It does not account for changes in the pitch and yaw of the head or changes due to differing perspective distortion (i.e. when the face is very close to the camera it appears foreshortened). However, these changes are likely to be small if the user maintains eye contact with the camera.

The degree of close-up in performing the crop can be adjusted. An extreme close-up of just the features of the face (forehead to chin) provides the most stable image if further machine processing is the goal. However, this does not produce an aesthetically pleasing image. A more natural head shot showing the whole face is also possible. The degree of close-up is controlled by the variables desiredRightEyeLocation and desiredEyeWidth which represent the desired co-ordinates of the right eye in the output image and the desired distance between the eyes in the output image. Referring to the above pseudo code for finding the head image, in the present embodiment, for an extreme close-up these variables are respectively set as 0.6, 0.2 and 0.3 times the width of the extreme close-up image in pixels. For a close-up, the variables are set as 0.4, 0.3 and 0.41 times the width of the close-up image in pixels.

In the present embodiment, the method of performing the affine warp and crop (450) is described by the pseudo code below:

```
affineWarpAndCrop(in rawImage:image,in eyeLocations:eyeLocations,in
desired EyeWidth:double, in desiredRightEyeLocation:point,out
alignedImage:image)
{
coeffs:double[2][3]
outex:int = desiredRightEyeLocation.x
outey:int = desiredRightEyeLocation.y
outew = desiredEyeWidth
lex:int = eyeLocations.left.x
rex:int = eyeLocations.right.x
ley:int = eyeLocations.left.y
rey:int = eyeLocations.right.y
//calculate distance between the eyes in input
edx:int = lex-rex
edy:int = ley-rey
ed:double = sqrt(edx*edx+edy*edy)
//calculate scale factor between input and output
double s:double = outew/ed
//setup some unit vectors
ev1x:double = edx*s/ed
ev1y:double = edy*s/ed
ev2x:double = -edy*s/ed
ev2y:double = edx*s/ed
//setup coefficients
coeffs[0][0] = ev1x
coeffs[0][1] = ev1y
coeffs[0][2] = -rex*ev1x-rey*ev1y+outrex
coeffs[1][0] = ev2x
coeffs[1][1] = ev2y
coeffs[1][2] = -rex*ev2x-rey*ev2y+outrey
//apply warp
warpAffine(rawImage,alignedImage,coeffs)
}
```

. . . where the warpAffine function is provided from the Intel IPL software library.

The result of the affine warp and crop (450) (which is also the result of the align head image (400) stage is an aligned image of the face (490) which is stored as either closeupImage or extremeCloseupImage depending on the degree of the crop.

This completes the stage of aligning the head image (400).

Normalise Light Direction (500)

Figure 7:
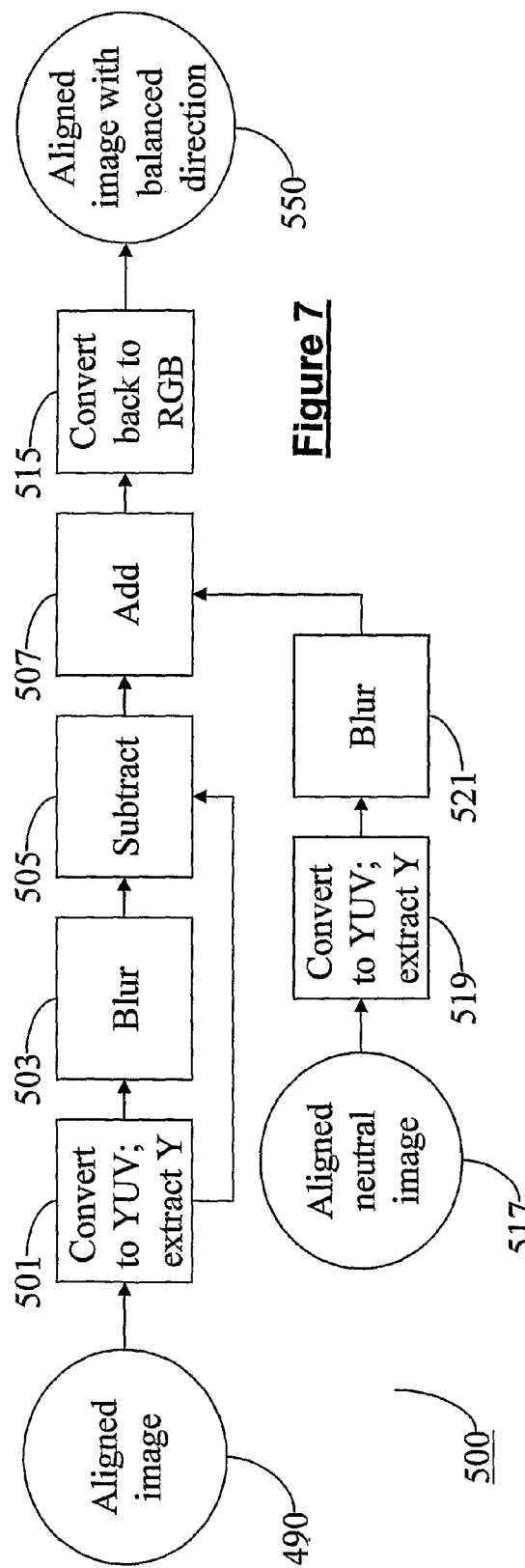
FIG. 7 is a flow diagram illustrating the operation of the normalise light direction stage of the image processing method.

With reference to FIG. 7, the process of normalising the light direction (500) falling on the head that has been found in stage 400 will now be described.

Referring once again to the pseudo code example for the image processing program (FIG. 3), it will be seen that the normalising of the light direction is carried out on either the extremecloseupimage data or the closeupimage data depending on the degree of the crop in the align head image stage 400.

In the present embodiment, the method of normalising the light direction (500) is described by the pseudo code below:

```
normaliseLightDirection(in alignedImage:image, in lowpassneutral:image,
out alignedbalancedImage:image)
{
RGB2YUV(alignedImage,yuv)
normaliseLightDirection2(lowpassneutral,yuv.y)
YUV2RGB(yuv,alignedbalancedImage)
}
normaliseLightDirection2(in lowpassneutral:image,inout grey:image)
{
//blur
convolveSep2D(grey,blur,lightDirGaussianKernelx,
lightDirGaussianKernely)
//subtract blurred from grey
subtract(grey,blur,b)
//add blurred neutral image
add(b,lowpassneutral,grey)
}
```

With reference to FIG. 7, the normalising of the light direction is carried out on the intensity information only which is contained in the Y (luminance) channel in YUV colour space. The input image data (referred to in the above pseudo code as alignedimage and comprising either the extremecloseupImage data or the closeupimage data) is converted from RGB colour space to YUV colour space and the Y channel (represented by the yuv.y variable in the above code) is extracted (501). In the present embodiment, this is performed using the RGB2YUV function of the Intel IPL software library.

It is assumed that the direction of light falling across the user's face causes a slow change from light to dark across the face. Thus most of the variation in the light intensity is captured in the low frequencies of the image. Gaussian blurring (i.e. convolving with a Gaussian) effectively low pass filters the image (step 503). In the present embodiment, this is carried out using the convolveSep2D function of the Intel IPL software library. The createGaussianKernels function described above can be used to set up the Gaussian kernels lightDirGaussianKernelx and lightDirGaussianKernely and would be called within the previously mentioned setup function as follows:

```
CreateGaussianKernels(41,lightDirGaussianKernelx,
lightDirGaussianKernely)
//filter length is 41 ≈ alignedImage.width/2
```

Subtracting this blurred version from the original leaves an image containing only high spatial frequencies (step 505). In the present embodiment, this is carried out using the subtract function of the Intel IPL software library, which performs a pixelwise subtraction of two images a & b to form a new image c such that c(x,y)=a(x,y)-b(x,y).

At this stage the effects of the lighting have been substantially removed but the resultant image does not look very natural and so some low frequency information is reinstated by adding in a Gaussian blurred (i.e. low pass filtered) version of an image of the head under neutral lighting (diffuse lighting that gives an even appearance to the face without strong shadows being cast across the face).

In the present embodiment, this Gaussian blurred image is created from either an aligned closeup or extreme closeup image of the head under neutral lighting depending on the degree of crop. These aligned neutral images 517 are not single images but mean images that are created by summing many aligned images, which has the effect of evening out changes in light direction.

As with the aligned image data 490, the aligned neutral image data 517 is first converted from RGB colour space to YUV colour space and the Y channel is extracted (519). In the present embodiment, this is performed using the RGB2YUV function of the Intel IPL software library. Gaussian blurring is then carried out (521) on the extracted data using the convolveSep2D function of the Intel IPL software library. Example pseudo code for the processing of the aligned neutral image is given below:

```
setupLightDirectionBalance(in neutralImage:image,out
lowPassNeutralImage:image)
{
RGB2YUV(neutralImage,yuv)
convolveSep2D(yuv.y,lowPassNeutralImage,lightDirGaussianKernelx,
lightDirGaussianKernely)
}
```

The blurred aligned neutral image need only be created once for each degree of crop and hence this function is called within the previously mentioned setup function as follows:

setupLightDirectionBalance(extremeCloseupNeutralImage,extremeCloseupBlurNeutral) setupLightDirectionBalance(closeupNeutralImage,extremeCloseupBlurNeutral)

The blurred neutral aligned image is then added (507) to the image data output from the subtraction step (505). In the present embodiment, this is carried out using the add function of the Intel IPL software library, which performs a pixelwise addition of two images a & b to form a new image c such that $c(x,y)=a(x,y)+b(x,y)$.

The resultant image data is then converted back to RGB colour space (515). In the present embodiment, this is performed using the RGB2YUV function of the Intel IPL software library.

The result of the normalising light direction stage (500) is an aligned image of the face with balanced light direction (550) which is stored as either balancedECImage or balancedcImage depending on the degree of the crop.

This completes the stage of normalising the light direction (500).

Correcting Colour Balance (600)

Figure 8:
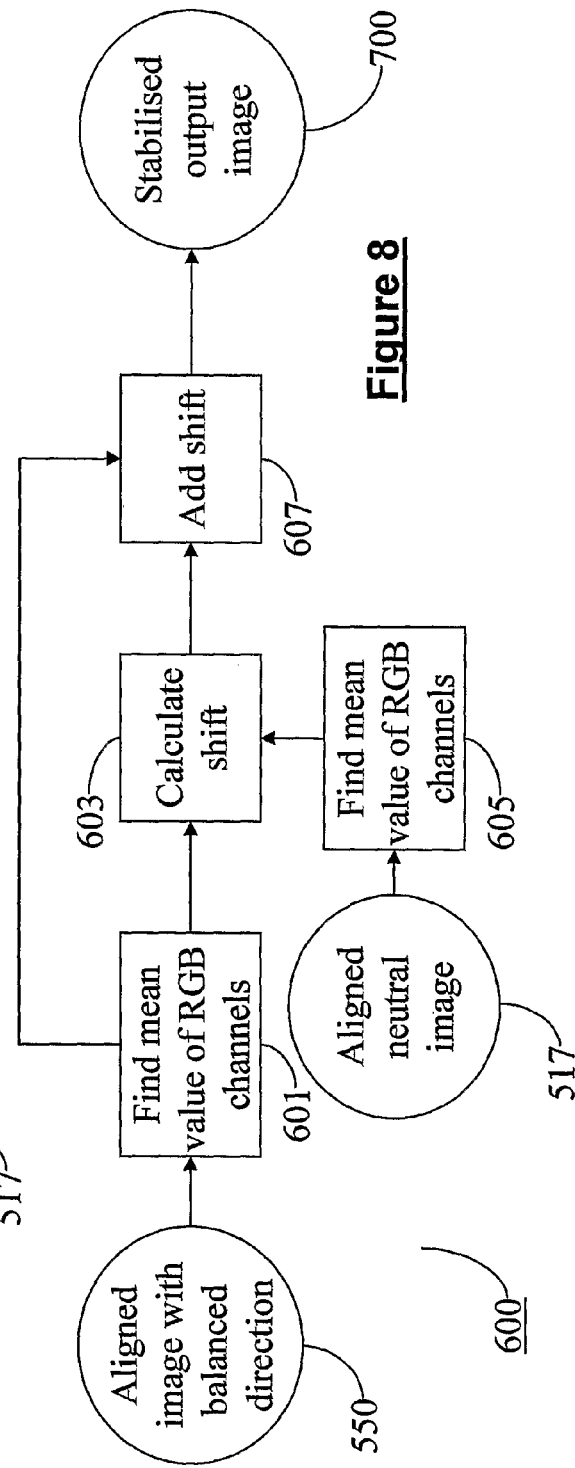
FIG. 8 is a flow diagram illustrating the operation of the colour balance stage of the image processing method.

With reference to FIG. 8, the process of correcting the colour balance (600) of the aligned image with balanced light direction (550) that was output from stage 500 will now be described.

It will be recalled that for the purposes of the present invention, the term 'colour' is intended to include both chromatic colours (those having hue—a property of colours by which they can be perceived as ranging from red to violet as determined by the dominant wavelength of the light) and achromatic colours (those lacking hue, i.e. white, grey and black).

Referring once again to the pseudo code example for the image processing program (FIG. 3), it will be seen that the correcting of the colour balance is carried out on either the balancedECImage data or balancedcImage data depending on the degree of the crop.

In the present embodiment, the method of correcting the colour balance (600) is described by the pseudo code below:

```
colourBalance(in alignedbalancedImage:image, out stabilisedimage)
{
//blue channel
mean:int = findMean(alignedbalancedImage.b)
shift:int = neutralMean.b-mean
shiftPixels(alignedbalancedImage,shift,stabilisedimage)
//green channel
mean:int = findMean(alignedbalancedImage.g)
shift:int = neutralMean.g-mean
shiftPixels(alignedbalancedImage,shift,stabilisedimage)
//red channel
mean:int = findMean(alignedbalancedImage.r)
shift:int = neutralMean.r-mean
shiftPixels(alignedbalancedImage,shift,stabilisedimage)
}
```

With reference to FIG. 8, the correcting of the colour balance is carried out on each channel of the RGB image separately and in step 601, the mean pixel value in each channel (red, green and blue) of the RGB image is calculated. In the pseudo code above this is represented by the findMean function which corresponds to the cvMean function of the Intel OpenCV software library. The mean pixel value in each channel of an aligned RGB image of the head under neutral lighting (517) is also calculated (605). Example pseudo code for the processing of the aligned neutral image is given below:

```
setupColourBalance(neutralImage:image)
{
neutralMean.b = findMean(neutralImage.b)
neutralMean.g = findMean(neutralImage.g)
neutralMean.r = findMean(neutralImage.r)
}
```

The mean pixel value in each channel of an aligned RGB image of the head under neutral lighting (517) need only be calculated once. Moreover, it is only calculated from the face region hence an aligned extreme closeup image of the head under neutral lighting is used. Consequently, this function is called within the previously mentioned setup function as follows:

setupColourBalance(extremeCloseupNeutralImage)

A pixel shift is then calculated (603) that will adjust the mean R,G,B values to match the neutral image and this shift is then added to each pixel (607).

The result of the correcting the colour balance stage (600) is an aligned image of the face with balanced light direction and corrected colour balance, in other words, a stabilised output image (700) which consists of either a closeup image (stabilisedCImage) or an extreme close up image (stabilisedECImage) of the face depending on the degree of the crop.

This completes the stage of normalising the light direction (500).

The effect of the mobileFacePreprocessor( ) function of image processing program (FIG. 3) on the video data is to reduce the variations in pixel values between frames that are caused by global motion of the object through the scene, relative motion between the camera and the object or electronic adjustment of certain camera parameters such as automatic white balance and exposure compensation such that after processing. The remaining changes in appearance of the object are substantially due to non-rigid deformations of the object (e.g. in the case of a face—changes of expression) and changes in the surface properties of the object (e.g. in the case of a face—wrinkling and blushing).

Referring once again to the above example pseudo code for the main loop of the image processing program, once a stabilised output image 700 has been obtained it can be used in some other function and this is represented by the function doSomething.

For example, the image processing program (FIG. 3) could be part of a video conferencing system in which case the stabilised output image could be encoded and transmitted using conventional video codecs (e.g. H.264) and network protocols (e.g. RTP, TCP). (There is also the possibility that in such a video conferencing system, this type of image processing will not be required at all times. For instance, there may be times when the context and surroundings of a person are more important than their expression. In such a video conferencing system it would therefore be possible to switch between encoding/transmitting the raw data and encoding/transmitting the stabilised output data.)

In an alternative example, the stabilised output image 700 may not be provided to another human user but rather to a machine that would perform some further image processing before forwarding to a human. It is also possible that the machine can reach its own automatic understanding of facial expressions and this would be useful in applications where the dynamics of certain facial expressions (e.g. a smile) are used to allow access to e.g. a computer network or secure location.

Alternatively, a camera could be mounted on the dashboard of a vehicle and used to capture video of the driver's face. In this scenario, the light falling across the face could change significantly (especially at night) in addition to there being direction changes to the face/head. The stabilised output images could be used to monitor the driver's alertness and therefore his ability to safely control the vehicle.

It will be realised that the image processing program (FIG. 3) will often be run prior to transmission of the video data and hence could be referred to as pre-processing.

It will be apparent from the foregoing description that many modifications or variations may be made to the above described embodiment without departing from the invention. Such modifications and variations include:

Although in the above described embodiment the image processing program was stored and run on computer system 1, it is also possible to store and run it on the mobile device 199. This would enable real time, human-human communication. In such embodiments, it is possible that the processing carried out by the image processing program could be split between the mobile device and the computer system. It is also possible that some of the processing could be split between the mobile device and base station to which it is connected or between the mobile device and another computer connected to the network. For example, the mobile device could perform the processing necessary to locate and align the head image with the base station/computer performing the processing necessary to normalise the light direction and adjust the colour balance. Alternatively, the global search for an eye pair could be performed at the base station/computer with the results being transmitted back to the mobile device.

In the above described embodiment, template matching was used in the local and global searches for a user's eyes. In alternative embodiments, template matching could be used in a local and/or global search for other features on a user's face, e.g. nostrils, eyebrows.

In alternative embodiments, template matching could be combined or even replaced with an adaptive colour matching method, as now described. Given an initial location for the face, it is possible to define regions of the image that are 'face' and 'non-face'. From these two regions it is possible to calculate two probability distributions: the probability that a pixel is colour c given that the pixel belongs to a 'face' region (P(pixel is colour c|pixel belongs to face)) and the probability that a pixel is a colour c given that the pixel belongs to a 'non-face' region (P(pixel is colour c|pixel is not part of face)). For a new image, Bayes' Theorem can be used to determine the probability that a pixel belongs to a 'face' region given that it is a colour c (P(pixel belongs to face pixel is colour c)) using the above two distributions, for each pixel. By examining the spatial distribution of pixels with high probability of belonging to the face, it is possible to determine the location of the face in the new image.

In this embodiment, colour would be best represented as YUV (or even HSV) rather than RGB, and to reduce the computation further, this space would be quite coarse (e.g. 4 bits for Y, 4 bits for U, 4 bits for V).

However, as the head and camera move, causing lighting changes, the colour of the face may no longer be well represented by these static probability distributions. Hence the distributions can be updated. Having located the face in the new image it is again possible to determine 'face' and 'non-face' regions. New probability distributions can be calculated from the pixels in these regions, and then the global distributions can be updated using a running average method.

For example, if pYUV(t) is the probability that a pixel has colour Y,U,V given that the pixel belongs to a 'face' region (P(pixel is colour Y,U,V|pixel is face)) calculated from the pixels in frame t; and gpYUV(t) is a running average probability that a pixel has colour Y,U,V given that the pixel belongs to a 'face' region (P(pixel is colour Y,U,V|pixel is face)) calculated from pixels in frame t then: gpYUV(t+1)=gpYUV(t)*(1−a)+pYUV(t)*a, where a is a constant and small (e.g. 0.1).

Alternatively, the probability distributions of the 'face' and 'non-face' regions could also be represented by Gaussian distributions, which might be more suitable for a mobile device implementation because a Gaussian can be more simply characterised by a mean and variance.

A complete loss of track of the face can be detected if the size/location of the face seems unlikely or the distribution of face coloured pixels is too sparse. In this case re-initialisation would be needed to locate the face.

If additional information about the orientation of the face is required, local feature matching (e.g. as described above in relation to local search 405) could be used to fine tune the decision on the location and orientation of the face.

Although in the above described embodiments Gaussian distributions were used in the global search for eye pairs, other probability distributions can be used. For example, training sequences can be used to create a 2D probability distribution for the relative locations of the eyes, i.e. the probability that the right eye is at a position (x+dx,y+dy) given that the left eye is at (x,y) (p(right eye is at (x+dx,y+dy)|left eye is at (x,y))). This 2D distribution can then be used to directly convolve the template match results instead of the offset/convolve-with-Gaussian steps described above. However, an advantage of using the offset/convolve-with-Gaussian steps is that the processing will be faster since the Gaussian convolution can be split into two 1D convolutions and involves of the order of 2n operations (as opposed to $n^2$ operations for convolving with a 2D distribution).

Another alternative to the process described above in relation to the global search is: Perform left and right eye template matches as before=>threshold the match scores=>locate the centroids of the remaining blobs to give n locations for the left eye and m locations for the right eye=>compare each possible pair of left/right eye locations (n*m possible pairs)=>score these pairs based on p(right eye is at (x+dx,y+dy)|left eye is at (x,y))=>choose eye pair as pair with highest score. This would be faster than the previously described method (and hence more suitable for implementation on a mobile device) but will fail if the correct location of an eye does not pass the threshold stage.

The above described method for correcting the colour balance assumes that the colour of a pixel output from the method is some function of the colour of the same pixel as input to the method, i.e. Output colour=F (Input colour), where F is a function whose properties are derived from measurements of the colour of the face and a desired output distribution of colours. Alternative functions to that described above in will be apparent to someone skilled in the art.

Although in the above described method for normalising the light direction, low pass filtering was achieved by convolution with a Gaussian filter kernel, other filter kernels could be used, e.g. Hanning, Kaiser. A Gaussian kernel is particularly effective, however, because it does not produce a lot of distortion and can be implemented as two 1D kernels, which results in fast computation. An alternative to low pass filtering in the spatial domain by convolving with a filter kernel is to convert the image to the frequency domain using a 2D Fast Fourier Transform (FFT), multiplying by a filter kernel which suppresses the high frequencies and performing the inverse FFT to return to the spatial domain.

Although in the above described embodiment the correcting colour balance step was performed in RGB colour space, it is also possible to perform it in YUV colour space (which is equivalent to performing in RGB colour space since the conversion between RGB and YUV is a linear transformation). In such an embodiment, the correcting colour balance step would not have any effect on the Y channel. In addition, it will be recalled that the normalising the light direction step is carried out on the Y channel only and hence does not affect the U and V channels. Hence, it would not matter in which order the normalising light direction and correcting colour balance steps were performed.

In terms of efficiency, it would be beneficial to perform both the steps in YUV colour space without converting back to RGB colour space in the middle of the two steps. In such an embodiment, the colour corrections to the Y channel would be deliberately ignored. In fact, it will be recalled that the template matching of the head locating is performed on greyscale images (Y channel only). Consequently, the entire process could be performed in YUV colour space with the output possibly being YUV images (since many video coders accept YUV data as an input). However, that would involve calculating U and V for areas of the image that are cropped out and so a possible order for the processing in such an embodiment would be: input RGB=>find Y=crop RGB and Y=>find U,V on cropped RGB=>affine warp and scale YUV=>normalise light direction on Y=>correct colour balance on U,V=>output YUV.

Although in the above described embodiment, the stabilised output image 700 comprises an RGB image, it is also possible that the desired output is a greyscale image of the head. In this case the image processing steps would be simplified since the raw image is initially converted to greyscale (equivalent to converting from RGB colour space to YUV colour space and discarding the U and V channels). There is then no need to convert the region of interest for template matching to greyscale in either the local or global search stages, no need to convert between RGB and YUV colour space when normalising the light direction and when correcting the colour balance there is only a single channel to adjust.

Although in the above described embodiment the output from the image processing program was a stabilised output image, it is also possible to provide at the output information relating to the position and scale of the head since the eyes remain at fixed locations within the head and the mean location of the eyes gives a good location of the head within the image.

The invention claimed is:

1. A method of processing video data captured by a handheld mobile video data capture device, said video data comprising a plurality of sets of frame data, said method comprising:

(a) finding a face in each frame of said video; and
(b) processing a corresponding set of frame data of the video data captured by the handheld mobile capture device to:
  (i) maintain the area of the image occupied by said face substantially constant; and
  (ii) maintain the apparent direction of light incident upon said face substantially constant; and
  (iii) maintain the apparent color of said face substantially constant.

2. A method according to claim 1, wherein finding a face comprises identifying one or more features on said face.

3. A method according to claim 2, wherein identifying one or more features comprises:
 comparing regions of said frame data with stored feature templates, each of said feature templates comprising an image of a facial feature and corresponding in size to said regions; and
 identifying each feature by identifying a match between a region of said frame data and one of said templates.

4. A method according to claim 3, wherein comparing regions comprises comparing each pixel in a region with its corresponding pixel in a template, said method further comprising generating a score for each comparison of a pixel in a region with its corresponding pixel in a stored eye template and identifying a feature by selecting the pixel having the greatest score.

5. A method according to claim 2, wherein said features comprise a pair of eyes on said face.

6. A method according to claim 5, further comprising checking the distance and angle of rotation between each of the eyes in said identified pair of eyes.

7. A method according to claim 1, wherein maintaining the apparent direction of light incident upon said face comprises:
 low pass filtering said frame data
 subtracting said low pass filtered version of said frame data from said frame data
 adding a low pass filtered version of previously stored reference frame data to said low pass filtered version of said frame data, wherein said previously stored reference frame data comprises an image of said face under neutral lighting.

8. A method according to claim 7, wherein low pass filtering is achieved by convolving said frame data with a predefined filter kernel.

9. A method according to claim 1, wherein maintaining the apparent color of said face comprises individually adjusting each color channel of said frame data to maintain relative offsets and absolute values of each color channel substantially constant.

10. A method according to claim 9, further comprising shifting the mean pixel value in each color channel of said frame data by a predetermined shift amount.

11. A method according to claim 10, wherein, for a selected colour channel, said shift amount corresponds to the difference between the mean pixel value of said selected channel in said frame data and the mean pixel value of said selected channel in previously stored reference frame data comprising an image of said face under neutral lighting.

12. A video processing device including:
 a non-transitory storage medium having recorded therein processor readable code processable to process video data captured by a handheld mobile video data capture device, said video data comprising a plurality of sets of frame data, said code comprising:
 identification code processable to identify a face in each frame of said video; and frame data processing code processable to process a corresponding set of frame data to:
(i) maintain the area of the image occupied by said face substantially constant; and
(ii) maintain the apparent direction of light incident upon said face substantially constant; and
(iii) maintain the apparent color of said face substantially constant.

13. A portable device comprising:
a handheld video data capture device, said video data comprising a plurality of sets of frame data;
a non-transitory storage medium having recorded therein processor readable code processable to process said video data captured by the handheld video data capture device of the portable device, said code comprising:
identification code processable to identify a face in each frame of said video; and
frame data processing code processable to process a corresponding set of frame data to:
(i) maintain the area of the image occupied by said face substantially constant; and
(ii) maintain the apparent direction of light incident upon said face substantially constant; and
(iii) maintain the apparent color of said face substantially constant.

14. A portable device according to claim 13, said portable device comprising a handheld device.

15. A non-transitory storage medium carrying a program of instructions executable by a processing apparatus to perform a method of processing video data captured by a handheld mobile video data capture device, said video data comprising a plurality of sets of frame data, said method comprising:
(a) receiving the video data captured by the handheld mobile video data capture device as input data;
(b) finding a face in each frame of said video; and
(c) processing a corresponding set of frame data to:
(i) maintain the area of the image occupied by said face constant; and
(ii) perform one or more of the following: (a) maintain the apparent direction of light incident upon said face constant, or (b) maintain the apparent color of said face constant.

16. A method comprising:
(a) receiving video data captured by a handheld mobile video data capture device as input data, said video data comprising a plurality of sets of frame data;
(b) finding a face in each frame of said video; and
(c) processing a corresponding set of frame data of the video data captured by the handheld mobile capture device to:
(i) maintain the area of the image occupied by said face constant; and
(ii) perform one or more of the following: (a) maintain the apparent direction of light incident upon said face constant, or (b) maintain the apparent color of said face constant.

17. A method according to claim 16, wherein finding a face comprises identifying one or more features on said face.

18. A method according to claim 17, wherein identifying one or more features comprises:
comparing regions of said frame data with stored feature templates, each of said feature templates comprising an image of a facial feature and corresponding in size to said regions; and
identifying each feature by identifying a match between a region of said frame data and one of said templates.

19. A method according to claim 18, wherein comparing regions comprises comparing each pixel in a region with its corresponding pixel in a template, said method further comprising generating a score for each comparison of a pixel in a region with its corresponding pixel in a stored eye template and identifying a feature by selecting the pixel having the greatest score.

20. A method according to claim 17, wherein said features comprise a pair of eyes on said face.

21. A method according to claim 20, further comprising checking the distance and angle of rotation between each of the eyes in said identified pair of eyes.

22. A method according to claim 16, wherein maintaining the apparent direction of light incident upon said face comprises:
low pass filtering said frame data
subtracting said low pass filtered version of said frame data from said frame data
adding a low pass filtered version of previously stored reference frame data to said low pass filtered version of said frame data, wherein said previously stored reference frame data comprises an image of said face under neutral lighting.

23. A method according to claim 22, wherein low pass filtering is achieved by convolving said frame data with a predefined filter kernel.

24. A method according to claim 16, wherein maintaining the apparent color of said face comprises individually adjusting each color channel of said frame data to maintain the relative offsets and absolute values of each color channel constant.

25. A method according to claim 24, further comprising shifting the mean pixel value in each color channel of said frame data by a predetermined shift amount.

26. A method according to claim 25, wherein, for a selected colour channel, said shift amount corresponds to the difference between the mean pixel value of said selected channel in said frame data and the mean pixel value of said selected channel in previously stored reference frame data comprising an image of said face under neutral lighting.

* * * * *